US005545282A

United States Patent [19]

Bechmann

[11] Patent Number: 5,545,282

[45] **Date of Patent: *Aug. 13, 1996**

[54] METHOD AND A DEVICE OF STRIPPING FOIL CUTTINGS

[76] Inventor: Peter Bechmann, Malensteinweg 2, D-82487, Oberammergau, Germany

[ * ] Notice: The term of this patent shall not extend beyond the expiration date of Pat. No. 5,252,169.

[21] Appl. No.: 309,768

[22] Filed: Sep. 21, 1994

[30] Foreign Application Priority Data

Sep. 24, 1993 [DE] Germany .......................... 43 32 564.5

[51] Int. Cl.[6] .......................... B32B 35/00

[52] U.S. Cl. .......................... 156/344; 156/248; 156/584; 271/37; 271/113; 271/281; 271/285; 83/106

[58] Field of Search .......................... 156/344, 584, 156/248, 249; 271/37, 113, 280, 281, 285, 286; 83/106

[56] References Cited

U.S. PATENT DOCUMENTS

| | | | |
|---|---|---|---|
| 3,921,973 | 11/1975 | Kitagawa et al. | 271/286 |
| 4,508,589 | 4/1985 | Tarui et al. | 156/344 X |
| 4,670,085 | 6/1987 | van der Meer et al. | 156/344 X |
| 4,720,091 | 1/1988 | Kobler | 271/280 X |
| 5,203,942 | 4/1993 | DeCook et al. | 156/344 X |
| 5,252,169 | 10/1993 | Bechmann | 156/344 |
| 5,271,789 | 12/1993 | Takagi et al. | 83/861 X |
| 5,288,358 | 2/1994 | Logan | 156/248 X |
| 5,368,672 | 11/1994 | Gunzelman et al. | 156/248 |

FOREIGN PATENT DOCUMENTS

| | | | |
|---|---|---|---|
| 1149540 | 4/1969 | United Kingdom | 271/286 |

*Primary Examiner*—Mark A. Osele
*Attorney, Agent, or Firm*—Ratner & Prestia

[57] ABSTRACT

To strip laminated foil cuttings, which are provided with incisions in a cover foil adhered to a carrier paper through a self-adhesive bottom layer, an incision forming a separation line is made into the carrier paper of a forward edge of each foil cutting before the edge zone is pulled off from the carrier paper by a transfer means in cooperation with a deflection edge.

11 Claims, 2 Drawing Sheets

METHOD AND A DEVICE OF STRIPPING FOIL CUTTINGS

Figure 1:
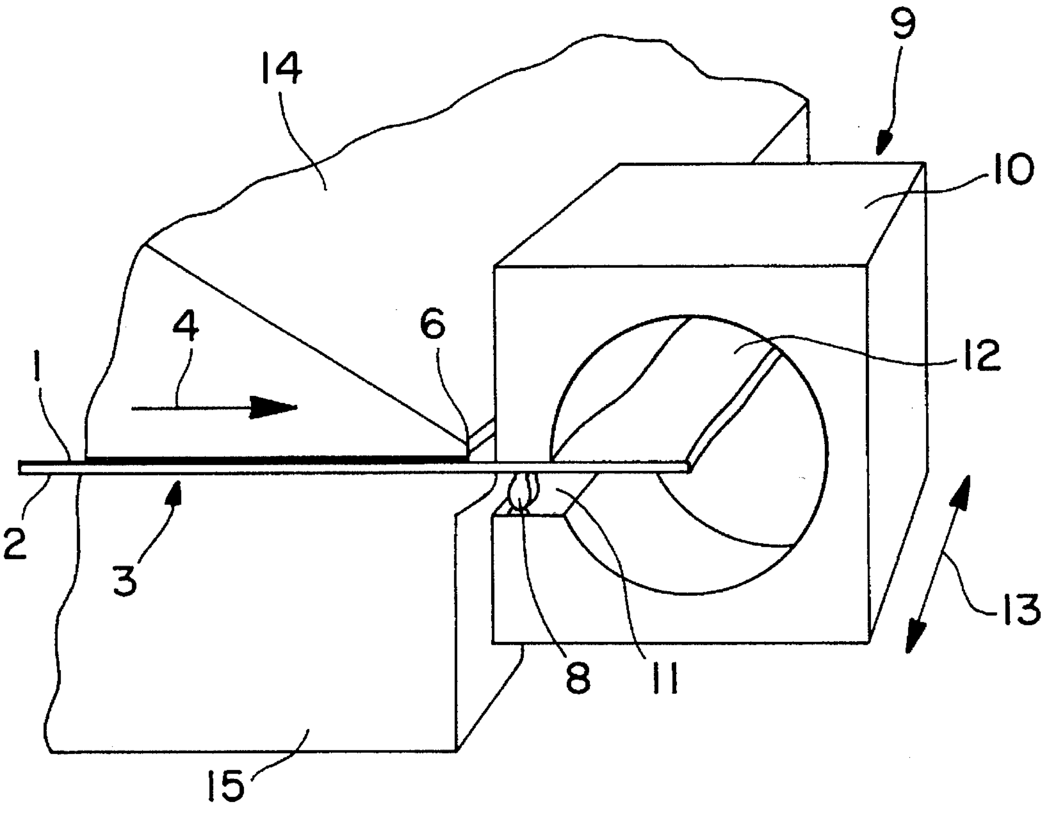

The present invention relates to a method and a device of stripping laminated foil cuttings made with incisions in a cover foil which is adhered to a carrier paper by means of a self-adhesive bottom layer. The incisions form an advertising print or a commercial art that is designed for application in a self-adhesive manner to an advertising space.

In a method known from EP 0,509,419 A1 (corresponding to U.S. Pat. No. 5,252,169) and a device of this class, the foil cuttings are influenced at a branch point of a given transportation direction in cooperation of a transfer means with a deflection edge in such a way that at each foil cutting, the foil remainder is pulled off from the carrier paper in a branched-off transfer direction for transfer to a remainder roller, while the carrier paper with the advertising print or commercial art remaining on its upper surface is removed in the given transportation direction. To make it possible to pull off the foil remainder from the carrier paper, which is defined as the actual stripping, in the first place, the forward edge of each foil cutting is cut by means of a cutting means, before reaching the deflection edge, with an obtuse angle inclined in such a way that the upper side of the cover foil projects forward over the lower surface of the carrier paper in the transportation direction. As a result, an initial line contact can thus be obtained for the cover foil with a rubber-elastic pad of a transfer means provided at the deflection edge on arrival of a foil cutting, so that when the foil cuttings are subsequently being moved in the transfer direction, the edge zone of the cover foil which is directly adjacent to the inclination of the forward edge is adhered to the pad through the self-adhesive bottom layer [of the foil cuttings], and it remains adhered to the pad until transfer to the remainder roller, as a result of which the foil remainder can be pulled off correspondingly securely from the carrier paper.

In the case of the prior-art stripping, trouble-free initiation of the pulling off of the cover foil or of the foil remainder from the carrier paper in cooperation of the transfer means with the deflection edge is decisively influenced by the quality of the inclined cutting initially performed at the forward edge of each foil cutting. The thinner the cover foil compared with the carrier paper, and the less it is initially possible to adhere the cover foil through its self-adhesive bottom layer to the pad of the transfer means so firmly that the pulling forces necessary for pulling off the cover foil in cooperation with the deflection edge can be generated to the necessary extent at all, the more problematic is the pulling off.

The basic task of the present invention is to improve the prior-art stripping of laminated foil cuttings such that the performance of an inclined cutting at the forward edge of each foil cutting can be eliminated, while the advertising print or the commercial art remaining on the carrier paper during the pulling off of the cover foil or of the foil remainder continues to be handled as gently as possible.

According to a principal feature of the present invention, a cutting means, with which an incision forming a separation line extending at right angles to the transportation direction is made at least into the carrier paper from the lower surface at a forward edge zone of each foil cutting at a spaced location from the forward edge of the foil cutting, is provided for stripping laminated foil cuttings. Subsequent to this incision of the separation line, the forward edge zone of each foil cutting is taken over by a clamping means of the transfer means to pull off the cover foil or the foil remainder for transfer to a remainder roller in analogous cooperation with a deflection edge, while the carrier paper with the advertising print or the commercial art remaining on its upper surface is removed in the originally predetermined transportation direction. The pulling off of the cover foil or of the foil remainder from the cover paper can thus be initiated in a trouble-free manner and be continued until the foil remainder is taken over by the remainder roller.

Figure 2:
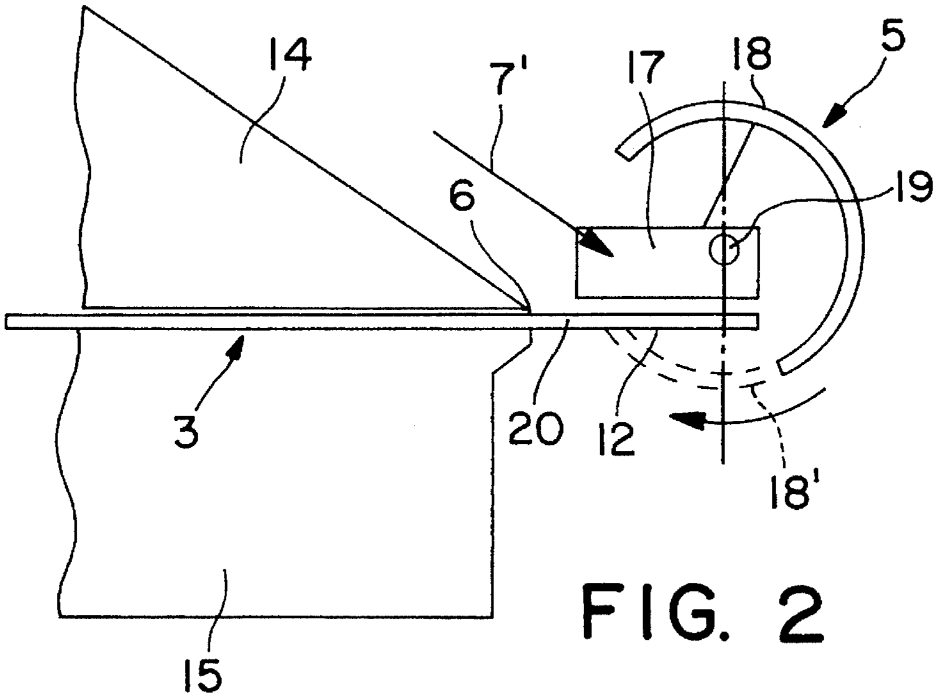
Figure 3:
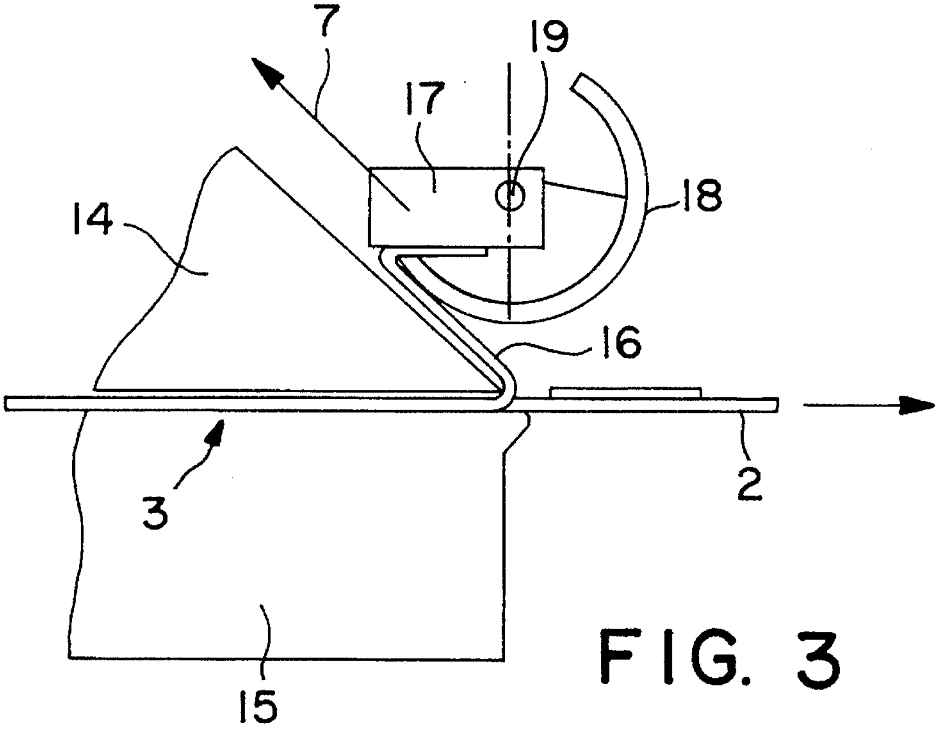

An exemplary embodiment of the device according to the present invention is shown in the drawing and will now be explained in more detail. In the drawing, FIG. 1 shows a schematic view of the cutting means as arranged at a forward edge zone of a foil cutting, FIG. 2 shows a schematic view of the transfer means in a position in which the forward edge zone of the foil cutting is taken over after an incision forming a separation line is made in the carrier paper, and FIG. 3 shows a schematic view of the transfer means in a position in which the extending [forward—typo in German original—Tr. Ed.] edge zone is moved further in a transfer direction branched off from a predetermined transportation direction.

Since the present invention was directly based on the prior-art method and device of stripping laminated foil cuttings according to EP 0,509,419 A1, only the details of the device which distinguish the present invention from the prior-art device are schematically shown in the drawing. Therefore, the device also comprises a transportation means (not shown), with which the foil cuttings 3 consisting of a cover foil 1 and a carrier paper 2 are transported in a predetermined transportation direction 4. The cover foil laminated to the carrier paper through a self-adhesive layer is provided with incisions, which form an advertising print or a commercial art, and which remain on the carrier paper when the cover foil or the foil remainder adjacent to the incisions is pulled off from the carrier paper in a branched-off transfer direction 7 in cooperation of a transfer means 5 with a deflection edge 6 as soon as an incision forming a separation line has been made into the carrier paper of a forward edge zone of the foil cuttings by means of a knife 8 of a cutting means 9.

The cutting means 9 is designed with a knife holder 10, in which the knife 8 is arranged at an entry gap 11 for the leading edge zone 12 of each foil cutting 3 in such a way that an incision forming a separation line extending at right angles to the transportation direction 4 can be made with the knife 8 into the carrier paper 2 from the lower surface. To make the incision forming the separation line, the knife holder 10 is reciprocatingly moved in the direction of the double arrow 13. To achieve this, the forward edge zone was first fed into the entry gap 11 to such an extent that a predetermined distance was obtained between the action line of the knife 8 and the forward edge of the given foil cutting. It [the foil cutting] was then clamped by a clamping means, which is designed with a pull-off strip 14 and a clamping strip 15 movable in relation thereto. To form the deflection edge 6, the pull-off strip 14 is provided with a tip, in which two guide surfaces for the cover foil 1 and for the foil remainder 16 of each foil cutting 3 meet. The guide surfaces extend in parallel to the predetermined transportation direction 4 and to the transfer direction 7 branched off therefrom. The clamping strip 15 can be moved from the lower surface of the carrier paper 2 toward the guide surface which is parallel to the transportation direction 4, to thus make it possible to clamp the given foil cutting 3 against the pull-off strip. This clamping is released as soon as the forward edge zone 12 has been transferred to the transfer means 5 after the incision forming the separation line has been made into its carrier paper 2 and after the cutting means 9 has been moved out of the path of movement of the given foil cutting 3.

As in the prior-art device according to EP 0,509,419 A1, the transfer means 5 is designed for a further transportation of the foil remainder 16 pulled off from the carrier paper 2 in cooperation with the deflection edge 6 to a remainder roller (not shown). The transfer means is moved for this purpose in the transfer direction 7 from the take-over position shown in FIG. 2. The transfer means 5 has a clamping means, which is designed with a clamping strip 17 and a clamping roller 18. The clamping roller 18 is connected to the clamping strip 17 at a rotational axis 19 to make possible a relative pivoting of the clamping roller from the relative position shown by solid lines in FIG. 2 into the relative position 18' shown by broken lines, in which a clamping gap of the clamping means 5 is closed for clamping the forward edge zone 12 of a given foil cutting 3 as soon as the incision forming the separation line 20 has been made into the carrier paper 2 with the cutting means 9. Therefore, when the transfer means 5 is moved in the transfer direction 7 after the forward edge zone 12 has been clamped, the foil remainder 16 is pulled off from the carrier paper 2 in cooperation with the deflection edge 6. The separation line 20, whose depth of cut should reach at least the lower surface of the cover foil 1 and preferably also comprises the scratching of this lower surface of the cover foil, ensures that the foil remainder can be initially pulled off from the carrier paper without any risk of damaging the advertising print or the commercial art remaining on the carrier paper due to the provision of a sufficiently strong pulling force by the clamping force of the clamping means.

As soon as the foil remainder has been taken over by the remainder roller and the clamping means of the transfer means 5 has been released for releasing the edge zone 12 clamped therewith, the transfer means remains in a position in relation to the pull-off strip 14 in which the taking up of the foil remainder on the remainder roller is not hindered. The transfer means is returned to the position shown in FIG. 2 in the direction of arrow 7' only after an incision forming a separation line 20 has been made into the carrier paper of a forward edge zone 12 of a next foil cutting. The cutting means has also first been returned for this purpose into the path of movement of the next foil cutting.

I claim:

1. A method of stripping laminated foil cuttings formed with incisions in a cover foil which is adhered to a carrier paper by means of a self-adhesive bottom layer, said incisions forming an advertising print designed for being applied in a self-adhesive manner to an advertising space, said advertising print remaining on an upper surface of said carrier paper when a foil remainder of said cover foil is removed from said carrier paper of said foil cuttings, the method comprising the steps of:

transporting said foil cuttings in a predetermined transportation direction;

providing a severance cut extending at right angles to the transportation direction, said severance cut being formed a) from the lower surface of said carrier paper with a depth of cut reaching at a maximum a scratching of the lower surface of said cover foil and b) into said carrier paper at a forward edge portion of each foil cutting at a predetermined distance from the forward edge thereof;

clamping with transfer means said forward edge portion of each foil cutting, which is provided with said severance cut on said carrier paper and arranging for further transportation of said transfer means at a deflection edge cooperating with said cover foil along a transfer direction which is branched off from the transportation direction;

pulling off from said carrier paper the foil remainder at said deflection edge for being transferred to a remainder roller arranged downstream in the transfer direction, while said carrier paper with the advertising print remaining on its upper surface is removed in the predetermined transportation direction.

2. A method according to claim 1, wherein the incision forming said separation line is made into said carrier paper of each said foil cutting with a depth of cut reaching at least the lower surface of said cover foil.

3. A method according to claim 1, wherein said severance cut in said carrier paper of said forward edge portion of each foil cutting is performed adjacent to said deflection edge.

4. A method according to claim 1, wherein each foil cutting is clamped by a clamping three acting between its upper surface and its lower surface over the period of performing said severance cut into said carrier paper of said forward edge portion zone.

5. A method according to claim 1, wherein after the incision forming said separation line has been made into said carrier paper, said forward edge zone of each said foil cutting is clamped by a clamping means of said transfer means until said foil remainder is transferred to the remainder roller.

6. A device of stripping laminated foil cuttings formed with incisions in a cover foil which is adhered to a carrier paper by means of a self-adhesive bottom layer, said incisions forming an advertising print designed for being applied in a self-adhesive manner to an advertising space said advertising print remaining on an upper surface of said carrier paper when a foil remainder of said cover foil is removed from said carrier paper of said foil cuttings by a transfer means in cooperation with a deflection edge along a transfer direction which is branched off from a predetermined transportation direction of said foil cuttings, comprising:

cutting means, being provided for cutting a severance cut into said carrier paper at a forward edge portion of each foil cutting at a predetermined distance from the forward edge thereof said severance cut extending at right angles to the transportation direction and being formed from the lower surface of said carrier paper with a depth of cut reaching at a maximum a scratching of the lower surface of said cover foil;

a clamping device being arranged on said transfer means, for initially clamping said forward edge portion having said severance cut for pulling off said foil remainder from said carrier paper until transfer of said foil remainder to a remainder roller.

7. A device according to claim 6, wherein said cutting means is arranged adjacent to said deflection edge.

8. A device according to claim 7, wherein said deflection edge is designed with the tip of a pull-off strip, which has two guide surface for said cover foil and for said foil remainder, which guide surfaces are parallel to the transportation direction and to the transfer direction and meet in the tip, wherein a clamping part, which is able to perform relative movements, cooperates with said guide surface that is parallel to the transportation direction, and each foil cutting is clamped by said clamping part against the guide surface of said pull-off strip over the period of performing said severance cut into said carrier paper of said forward edge portion.

9. A device according to claim 6, wherein said cutting means is provided with a blade holder having a blade and being, movable reciprocatingly at right angles to said transportation means for progressively performing said severance cut into said carrier paper of said forward edge portion.

10. A device according to claim 6, wherein said clamping means of said transfer means has two clamping parts, which are movable relative to each other and are arranged for coming into contact with the upper surface of said cover foil and with the lower surface of said carrier paper for clamping said forward edge portion of each said foil cutting.

11. A device according to claim 10, wherein the said two clamping parts are connected to one another via a rotational axis extending at right angles to the predetermined transportation direction, so that an adjustable clamping gap can be closed and opened for said forward edge zone of each said foil cutting by a relative pivoting of said two clamping parts.

* * * * *

UNITED STATES PATENT AND TRADE MARK OFFICE
CERTIFICATE OF CORRECTION

PATENT NO. : 5,545,282
DATED : August 13, 1996
INVENTOR(S) : Peter Bechmann

It is certified that error appears in the above-identified patent and that said Letters Patent is hereby corrected as shown below:

Column 4, claim 4, line 19, after "clamping" delete "three" and insert --force--.

Signed and Sealed this

Third Day of December, 1996

Attest:

BRUCE LEHMAN

*Attesting Officer*

*Commissioner of Patents and Trademarks*